Figure 1:
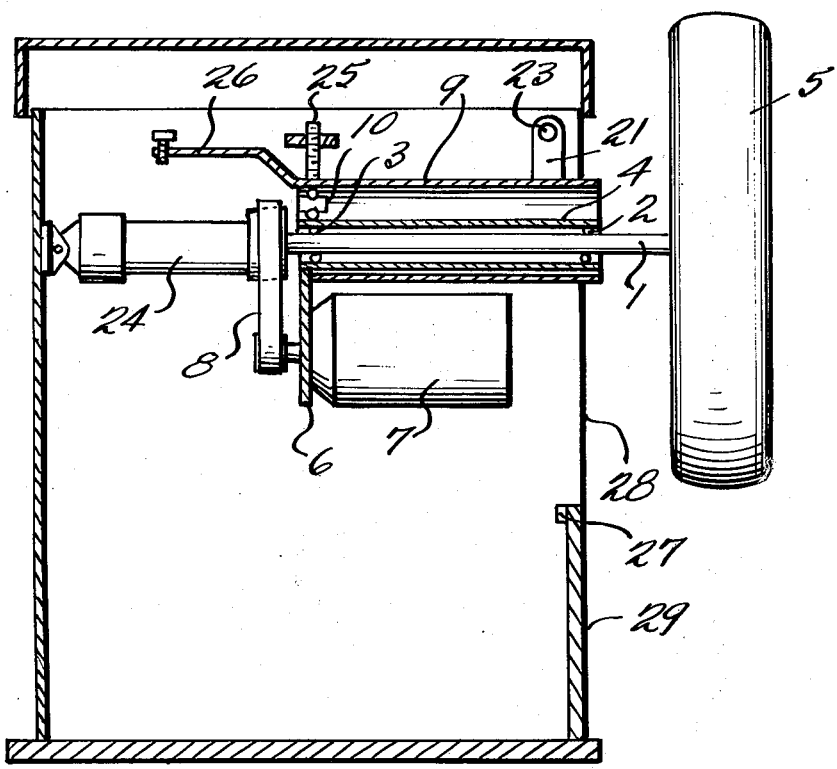

United States Patent [19]
Goebel

[11] 3,922,922
[45] Dec. 2, 1975

[54] DEVICE FOR BALANCING UNBALANCED ROTORS IN WHICH THE ROTOR CAN SWING BETWEEN HORIZONTAL AND VERTICAL POSITIONS

[75] Inventor: Eickhart Goebel, Pfungstadt, Germany

[73] Assignee: Gebr. Hofmann KG, Darmstadt, Germany

[22] Filed: Apr. 29, 1974

[21] Appl. No.: 465,440

[30] Foreign Application Priority Data
Apr. 27, 1973 Germany.............................. 2321437

[52] U.S. Cl. ...................... 73/462; 73/459; 73/471
[51] Int. Cl.² ............................................ G01M 1/22
[58] Field of Search ....... 73/66, 459, 460, 462, 471, 73/472

[56] References Cited
UNITED STATES PATENTS

| | | | |
|---|---|---|---|
| 2,349,552 | 5/1944 | Holmes | 73/459 |
| 2,532,056 | 11/1950 | Carrigan | 73/459 |
| 3,774,456 | 11/1973 | Crump | 73/462 |

*Primary Examiner*—James J. Gill
*Attorney, Agent, or Firm*—Cushman, Darby & Cushman

[57] ABSTRACT

Apparatus for balancing rotors, such as motor vehicle tires, with a shaft onto which the rotor is mounted, a inner housing mounting the shaft and rotor for rotation and an outer housing connected to the inner housing by a pair of leaf springs and vibration transducers. The outer and inner housings together with the shaft and rotor can be pivoted to shift the rotor between horizontal and vertical positions.

15 Claims, 3 Drawing Figures

U.S. Patent   Dec. 2, 1975   Sheet 2 of 2   3,922,922

DEVICE FOR BALANCING UNBALANCED ROTORS IN WHICH THE ROTOR CAN SWING BETWEEN HORIZONTAL AND VERTICAL POSITIONS

The present invention relates to a device for balancing imbalanced rotors, particularly wheels of motor vehicles, having a rotatable shaft for receiving rotors, supported at several points where vibration transducers are fitted so that the imbalance is detected and compensated in two planes.

With conventional balancing devices, electric signals are produced by means of transducers which detect vibrations and produce electrical signals. These signals determine the size and angular position of imbalance in both compensation planes, which, in the case of motor vehicle wheels, lie at the inside and outside of the rim. By applying the compensating weights at the determined points of the rim, i.e. in the corresponding planes of the imbalanced rotor, imbalances can be compensated statically and dynamically.

During dynamic balancing of imbalanced rotors, the latter are brought in rotation with the shaft carrying the imbalanced rotor, e.g. the motor vehicle wheel, supported in two planes. Basically, there are several ways to balance, which depend on the relation between the natural frequency of the rotor to be balanced and its suspension and the rotational speed of the imbalanced rotor to be tested.

The invention relates in particular to a device which belongs to the group of balancing machines featuring a high natural frequency, i.e. an operating speed below the natural frequency of the suspension-and-motor system. Such devices offer the advantage that only the forces actually developing in the system are measured and that the forces of reaction acting on the bearings are proportional to the physical dimensions of the system, so that the mass of the rotor being tested is practically of no influence. With the aid of the known electronic computers, it is possible to determine the compensating weights for the rotor being tested by simply converting the forces of reaction of the bearings on the compensation planes. When motor vehicle wheels are to be balanced, the two rim edges are generally chosen as inner and outer balancing planes.

With known devices of this kind, two separate bearings are provided. As described in German Pat. No. 2,114,770, the drive is usually effected through a belt pulley which is connected to a motor mounted on the machine housing. Impacts caused by the belt and transmitted to the shaft produce incorrect test results. Furthermore, it is not possible with this type of known device to tilt the shaft from the horizontal into a vertical plane, which would permit an easier and safer mounting of the imbalanced rotor on the shaft. In addition, centering errors in the mounting operation could be avoided more easily than if the shaft were in a horizontal position.

With the known device according to the German Pat. No. 1,947,090, too, the drive is effected through a motor which is mounted directly on the machine housing. Although a joint bearing housing has been chosen for this known device, no weight-receiving device is provided for the vertical arrangement so that the system would be jammed because of the slot in the housing, thus preventing any free movement.

It is the aim of the invention to present a device for balancing unbalanced rotors with which the latter can be fixed on the shaft safely and without the risk of producing centering errors, and which ensures a safe and easy application of the compensating weights.

Referring to the abovementioned device, this task is solved according to the invention in that the receiving shaft is adapted for movement between a horizontal and a vertical position. The shaft may be fixed for this purpose in an outer tiltable housing. Furthermore, it may be carried in an inner housing which is aligned in the outer housing. The shaft is in this case supported by roller bearings in the inner housing.

The motor driving the shaft is preferably directly and rigidly connected to the inner housing. Owing to this arrangement, impacts, e.g. those of the belt drive, only act within the system and not toward the outside. Therefore, the results of measurement are not affected by the drive imparting rotation to the shaft.

The inner housing may be supported against the outer housing by means of springs and vibrating transducers. The springs may be leaf springs acting on the inner housing from diametrically opposed sides and supported against the outer housing. In addition, the vibration transducers may be arranged in such a way that the inner housing is stably supported in the outer housing.

The inner housing is so fixed inside the outer housing by means of the leaf springs that it is accurately aligned in two transverse directions, i.e. in one plane. For fixing the inside housing in the third transverse direction, it is supported against the bottom of the outer housing by means of one vibration transducer. Supporting may, however, also be effected by providing one transducer for the bottom and two transducers for the top of the outer housing. In this way an oblique tilting of the inner housing in relation to the outer housing is prevented. Cone bearings are preferably provided on opposite sides in order to make an assembly comprising the outer housing, the inner housing, the shaft and the motor tiltable. These cone bearings serve at the same time for fixing the outer housing horizontally as the tapered spigots are pressed into mating bore holes be their weight.

The assembly comprising the outer and inner housings, the shaft and the motor, may be swung from the horizontal in the vertical position and vice versa by means of a hydraulic or a mechanical device. A stop is provided for both positions, against which the assembly is pressed by constant force. This pressure exceeds the weight of the assembly and the maximum imbalance force. This is of advantage inasmuch as no extra locking device is required and the outer housing is additionally fixed in the horizontal plane.

Owing to this invention, the shaft can be tilted in a vertical plane, in which the imbalanced rotors, above all motor vehicle wheels, can be mounted easily and safely. In this vertical plane no wheel centering errors present themselves which would indicate a non-existing imbalance during the subsequent measuring procedure. Measuring can now be effected with the shaft in the vertical or in the horizontal position. For compensation of imbalance, it is advantageous to swing the shaft in the horizontal position, in order to render possible a safe and accurate application of compensating weights.

Another advantage lies in the fact that the device according to the invention can be easily installed in fitting and balancing lines which are provided with roller conveyors for imbalanced rotors, particularly the motor vehicle wheels.

Figure 2:
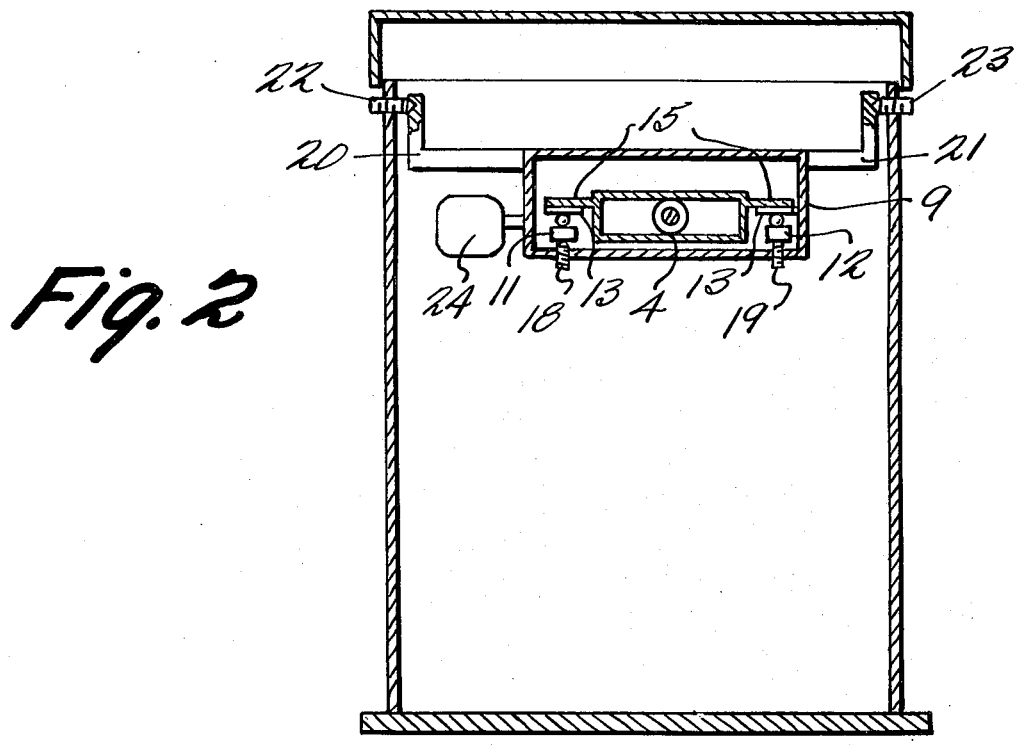

The enclosed figures serve for explaining in detail the invention, with the aid of an example:

FIG. 1 Schematic sectional view of a balancing device;

FIG. 2 Schematic lateral view of the balancing device shown in FIG. 1, and

Figure 3:
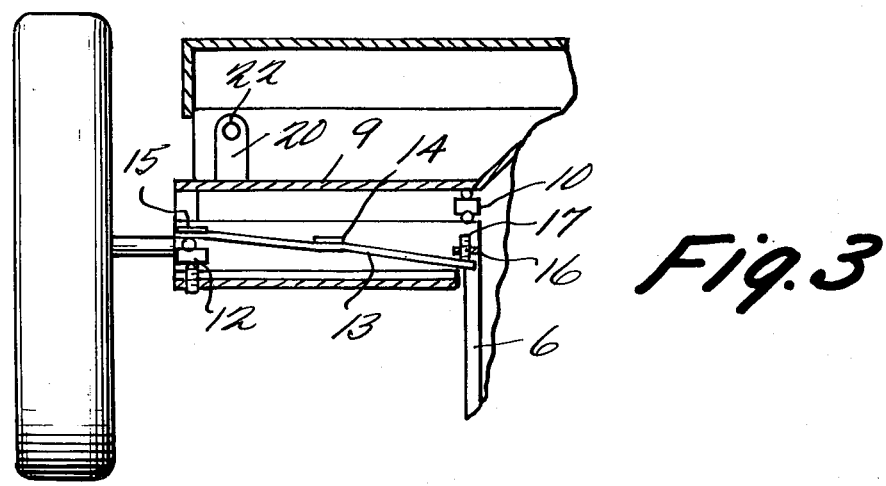

FIG. 3 Schematic view of the bearing of the tiltable parts of the balancing device according to FIGS. 1 and 2.

The device shown in the figures comprises a shaft 1 in a machine housing 29, designed for receiving a motor vehicle tire 5. The shaft 1 is mounted in an inner housing 4, on ball bearings 2 and 3. Tire 5 is fitted on the shaft 1 by known means (not shown). A drive motor 7 is provided on a bracket 6 attached directly to the inner housing 4, e.g. the inner housing and the bracket may be formed of one piece. Shaft 1 and with it the motor vehicle tire 5 to be balanced are rotated through a belt drive 8.

Inner housing 4 is fixed inside an outer housing 9, as shown best in FIGS. 2 and 3, by means of conventional load cells, 10, 11, and 12 and springs 13. The latter are leaf springs arranged on both sides of the inner housing 4. The springs 13 are attached to the outer housing by means of lugs 14 provided on the outer housing.

Springs 13 act on inner housing 4, and for this purpose lugs 15 and 16 are provided on opposite sides of the housing 4. The lugs 15 and 16 serve as hinge points and fixing points for the springs 13. Load cells 11 and 12 are arranged between lugs 15 and the bottom of the outer housing 9; these load cells can be prestressed by the prestressing means 18 and 19, for example screws. Lugs 15 and load cells 11 and 12 are arranged on the end of the inner housing which faces the rotor to be balanced. The two force-measuring elements 11 and 12 are arranged at the height of the axle of the shaft 1.

The other ends of the springs 13, which are arranged on the side turned away from the motor vehicle tire to be balanced, act through lugs 16 which is attached to bracket 6 in turn attached to inner housing 4, on a load cell 10, which can also be prestressed by means of a prestressing screw 17. This load cell 10 is arranged vertically above the axle of the shaft 1, at the end of the inner housing 4 which is turned away from the tire to be balanced.

On both sides of the outer housing 9 brackets 20 and 21 at their upper ends are provided with respective cone bearings 22 and 23. The whole assembly comprising the outer housing 9, the inner housing 4, the shaft 1 and the motor 7, can be swung around the cone bearings. For this procedure a hydraulic cylinder assembly 24 is attached to machine housing 29. The cylinder assembly 24 acts on the side of the outer housing 9, as can be clearly seen from FIGS. 1 and 2. The cylinder assembly 24 is designed as double-acting cylinder which presses the whole assembly at constant force horizontally against a stop 25. A bracket 26 which can be made to press against a stop 27 on the machine housing 29 ensures the vertical position of the assembly.

The machine housing 29 has in addition a recess 28 through which the whole assembly may be easily swung from the horizontal into the vertical position.

What is claimed:

1. In an apparatus for balancing imbalanced rotors, having a rotatable shaft, the unbalance being determined and compensated in two planes, the improvement wherein said shaft is mounted for rotation in an inner housing, an outer housing supporting said inner housing, transducer means disposed between said housings for detecting the vibrations on said rotating shaft, means for swinging said shaft and housings between a horizontal and a vertical position and means mounted on said inner housing for rotating said shaft.

2. In an apparatus as defined in claim 1, the further improvement wherein said shaft rotating means includes a motor driving said shaft mounted directly on said inner housing.

3. In an apparatus as defined in claim 1, the further improvement wherein in said inner housing is supported against said outer housing by means of springs.

4. In an apparatus as defined in claim 3, the further improvement wherein said springs are leaf springs applying a force against the inside of said inner housing on both sides, and that said springs are supported against the outer housing:

5. In an apparatus as defined in claim 3, wherein said inner housing is stably supported against said outer housing by three vibration transducers.

6. In an apparatus as defined in claim 5, the further improvement wherein said inner housing is supported against the bottom of said outer housing by two vibration transducers and against the top by one vibration transducer.

7. In an apparatus as defined in claim 6, the further improvement wherein said two vibration transducers are arranged between said springs and the bottom of said outer housing.

8. In an apparatus as defined in claim 4, the further improvement including hydraulic means for swinging between a vertical and horizontal position an assembly comprising said outer housing, said inner housing, said motor and said shaft.

9. In an apparatus as defined in claim 8, the further improvement wherein the swivel axis of said outer housing is formed by two cone bearings.

10. In an apparatus as defined in claim 8, the further improvement wherein in one stop each is provided for the horizontal and vertical position of said assembly against which the assembly can be pressed.

11. In an apparatus as defined in claim 10, the further improvement wherein the contact pressure exceeds the weight of the swingable assembly with the added maximum unbalance force.

12. An apparatus for balancing imbalanced rotors comprising:
a rotatable shaft for mounting a rotor to be balanced,
a first housing mounting said shaft for rotation,
a second housing,
means mounted on said first housing for rotating said shaft, and
means for mounting said first housing within said second housing including first transducer means for producing an imbalance signal in a first balancing plane and second transducer means for producing an imbalance signal in a second balancing means.

13. Apparatus as in claim 12, including means connected to said second housing for rotating said shaft and housings to shift said rotor between a horizontal and vertical position.

14. An apparatus as in claim 13, wherein said rotating means includes a hydraulic cylinder connected to said second housing.

15. Apparatus as in claim 12, wherein said mounting means includes a pair of leaf springs connecting said second housing to said first housing and said first transducer means include a pair of transducers supporting said first housing in said first plane and a single transducer supporting said first housing in said second plane.

* * * * *